US008913987B2

(12) United States Patent
Lee et al.

(10) Patent No.: US 8,913,987 B2
(45) Date of Patent: Dec. 16, 2014

(54) METHOD AND APPARATUS FOR PROVIDING QOS-BASED SERVICE IN WIRELESS COMMUNICATION SYSTEM

(75) Inventors: Ji-Cheol Lee, Suwon-si (KR); Sung-Ho Choi, Suwon-si (KR); Haris Zisimopoulos, Staines (GB); Song-Yean Cho, Seoul (KR); Alper Yegin, Istanbul (TR); Erik Guttman, Waibstadt (DE); Beom-Sik Bae, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 160 days.

(21) Appl. No.: 13/361,042

(22) Filed: Jan. 30, 2012

(65) Prior Publication Data
US 2012/0196566 A1 Aug. 2, 2012

(30) Foreign Application Priority Data
Jan. 28, 2011 (KR) .................. 10-2011-0009104

(51) Int. Cl.
*H04M 11/00* (2006.01)
*H04M 15/00* (2006.01)
*H04W 4/24* (2009.01)
*H04W 28/24* (2009.01)

(52) U.S. Cl.
CPC ...... *H04M 15/8016* (2013.01); *H04M 15/8022* (2013.01); *H04W 4/24* (2013.01); *H04W 28/24* (2013.01); *H04M 15/8011* (2013.01); *H04M 15/80* (2013.01); *H04M 15/81* (2013.01)
USPC ............ 455/408; 455/407; 455/406; 455/405

(58) Field of Classification Search
CPC . H04M 15/66; H04M 15/80; H04M 15/8011; H04M 15/8016; H04M 15/8022; H04M 15/81; H04W 28/24; H04W 48/08; H04W 4/24
USPC ................... 370/310, 332; 455/405–408, 455/414.1–414.3, 418, 425, 432.3, 455/435.1–435.3, 456.6, 512
See application file for complete search history.

(56) References Cited

U.S. PATENT DOCUMENTS

| 2003/0140131 A1* | 7/2003 | Chandrashekhar et al. .. 709/223 |
| 2009/0068984 A1* | 3/2009 | Burnett ......................... 455/408 |

(Continued)

FOREIGN PATENT DOCUMENTS

| KR | 10-2005-0072993 A | 7/2005 |
| KR | 10-2006-0019239 A | 3/2006 |

(Continued)

*Primary Examiner* — Dinh P Nguyen
(74) *Attorney, Agent, or Firm* — Jefferson IP Law, LLP

(57) ABSTRACT

A method and an apparatus for providing a Quality of Service (QoS)-based service in a wireless communication system are provided. The method includes providing a Mobile Station (MS) with at least one QoS plan indicating a price policy for a QoS acceleration service having a higher QoS than a default QoS designated for a user of the MS in response to a request from the MS, providing the MS with an authorized token and a QoS quota based on a selected QoS plan in response to a purchase request of the MS, providing the MS with service contents selected by the user through a radio bearer for the QoS acceleration service, notifying the MS, if a usage of the QoS acceleration service reaches a threshold, of an impending expiration of the QoS acceleration service, and notifying the MS of the expiration of the QoS acceleration service.

20 Claims, 20 Drawing Sheets

(56) References Cited

U.S. PATENT DOCUMENTS

2010/0099393 A1* 4/2010 Brisebois et al. ............. 455/418
2010/0214977 A1* 8/2010 Hegde ........................... 370/328

FOREIGN PATENT DOCUMENTS

| KR | 10-2010-0027473 A | 3/2010 |
| WO | 2010/098534 A1 | 9/2010 |

* cited by examiner

METHOD AND APPARATUS FOR PROVIDING QOS-BASED SERVICE IN WIRELESS COMMUNICATION SYSTEM

PRIORITY

This application claims the benefit under 35 U.S.C. §119(a) of a Korean patent application filed in the Korean Intellectual Property Office on Jan. 28, 2011 and assigned Serial No. 10-2011-0009104, the entire disclosure of which is hereby incorporated by reference.

BACKGROUND OF THE INVENTION

1. Field of the Invention

The present invention relates to a wireless communication system. More particularly, the present invention relates to a method and apparatus for providing a Quality of Service (QoS)-based acceleration service in a wireless communication system.

2. Description of the Related Art

Mobile Stations (MSs) or users of MSs desiring to transmit or receive data traffic in a wireless communication system may require a guarantee for a desired Quality of Service (QoS) (e.g., a desired data rate), a low latency, and stable communications, for high-speed data communication. Additionally, a cellular service operator (or a cellular operator) may operate and/or provide a variety of data and QoS plans in order for users to meet the QoS requirements and may use a QoS-based billing system.

Examples of operator services for QoS-based billing may include operator-sponsored charging provided as an operator promotion for selected services, services by paid applications known to users, such as a turbo service guaranteeing high-speed data communication, and time-based services such as online data coupons.

In a relate-art mobile communication system, different flat-rate plans, including a fixed amount of data, are selected by different users. Accordingly, a user may no longer enjoy the data service when the user has exhausted the fixed amount of data allocated according to the plan the user selected. In this case, the user may want to temporarily enjoy data services further without changing his or her plan, or may want to be provided with a high-QoS data service for specific service or data content while using a plan that is incapable of the high-QoS data service. However, the related-art mobile communication system may not support these diverse needs of users.

Therefore, a need exists for a system and method for performing a self diagnosis of a device without the inconvenience caused when manually selecting a self diagnosis item from a computer or a user interface.

SUMMARY OF THE INVENTION

Aspects of the present invention are to address at least the above-mentioned problems and/or disadvantages and to provide at least the advantages described below. Accordingly, an aspect of exemplary embodiments of the present invention is to provide a method and apparatus for providing a high-data rate acceleration service for service content selected by a user.

Another aspect of exemplary embodiments of the present invention is to provide a method and apparatus for providing accelerated Quality of Service (QoS) to a user for specific service content by a cellular operator.

Furthermore, another aspect of exemplary embodiments of the present invention is to provide a method and apparatus for requesting a high-data rate service from a cellular operator for service content desired by a user.

Yet another aspect of exemplary embodiments of the present invention is to provide a mobile system operating method and apparatus for providing high-data rate services for service content requested by a user.

In accordance with an aspect of the present invention, a method for providing a QoS-based service in a wireless communication system is provided. The method includes providing a Mobile Station (MS) with at least one QoS plan indicating a price policy for a QoS acceleration service in response to a request from the MS for the QoS acceleration service having a higher QoS than a default QoS designated for a user of the MS, providing the MS with an authorized token and a QoS quota based on a QoS plan selected for the QoS acceleration service in response to a purchase request of the MS, providing the MS with service contents selected by the user through a radio bearer, such as a radio bearer, or RF bearer, for the QoS acceleration service, if a usage of the QoS acceleration service reaches a threshold according to the QoS quota, notifying the MS of an impending expiration of the QoS acceleration service, and if the QoS acceleration service has expired, notifying the MS of the expiration of the QoS acceleration service.

In accordance with another aspect of the present invention, an apparatus for providing a QoS-based service in a wireless communication system is provided. The apparatus includes a memory for storing at least one QoS plan indicating a price policy for a QoS acceleration service in response to a request from a MS for the QoS acceleration service having a higher QoS than a default QoS designated for a user of the MS, and a controller for providing the QoS plan to the MS, determining an authorized token and a QoS quota based on a QoS plan selected by the user for the QoS acceleration service in response to a purchase request of the user, and providing the MS with service contents requested by the user of the MS through a radio bearer for the QoS acceleration service. If a usage of the QoS acceleration service reaches a threshold according to the QoS quota, the controller notifies the MS of an impending expiration of the QoS acceleration service, and if the QoS acceleration service has expired, the controller notifies the MS of the expiration of the QoS acceleration service.

In accordance with another aspect of the present invention, a method for selecting a QoS-based service in a MS of a wireless communication system is provided. The method includes displaying, on a screen of the MS, at least one QoS plan indicating a price policy for a QoS acceleration service in response to a request from a user of the MS for the QoS acceleration service having a higher QoS than a default QoS designated for a user of the MS, transmitting a purchase request corresponding to a selected one of the at least one QoS plan to a Base Station (BS) providing the MS with an authorized token and a QoS quota based on the selected QoS plan, and receiving, at the MS, service contents selected by the user through a radio bearer for the QoS acceleration service.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features, and advantages of certain exemplary embodiments of the present invention will be more apparent from the following description taken in conjunction with the accompanying drawings, in which.

Throughout the drawings, the same drawing reference numerals will be understood to refer to the same elements, features and structures.

DETAILED DESCRIPTION OF EXEMPLARY EMBODIMENTS

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions are omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention is provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

In this specification, although reference will be made to a specific communication protocol and system structure in the description of a Quality of Service (QoS) acceleration service in a mobile communication system, it will be understood by those of ordinary skilled in the art that the proposed acceleration QoS provision will not be limited to the specific communication protocol and system structure and aspects of the present invention may be applied to any suitable communication protocol and system structure.

Figure 1:
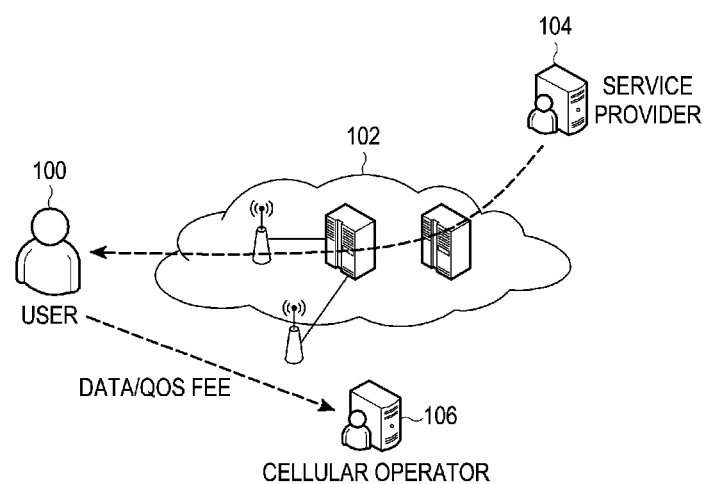
FIG. 1 illustrates a schematic structure of a network for providing a Quality of Service (QoS) acceleration service to a user according to an exemplary embodiment of the present invention.

FIG. 1 illustrates a schematic structure of a network for providing a QoS acceleration service to a user according to an exemplary embodiment of the present invention.

Referring to FIG. 1, a user 100 may use data services having different QoS levels or types by using a Mobile Station (MS) or a User Equipment (UE), such as a cellular phone, a Personal Digital Assistant (PDA), a smart phone, or other similar electronic devices. The MS, which uses subscribed cellular services provided by a cellular operator 106, may receive desired service content from a service provider 104 on an Internet Protocol (IP)-based data network through a Radio Access Network (RAN) 102, and display the received service content so that the user 100 may view the displayed service content.

The RAN 102, which is operated by the cellular operator 106, includes network elements corresponding to a communication protocol of a specific Radio Access Technology (RAT). For example, the RAN 102 of a General Packet Radio Service (GPRS)-based 3rd Generation (3G) Partnership Project (3GPP) and Long-Term Evolution (LTE) systems may include a Node B for directly setting up a wireless interface to the MS, a Radio Network Controller (RNC), and a Packet Data Network (PDN) Gateway (P-GW) for providing access to a data network.

The service provider 104, providing service content to the MS of the user 100 through a PDN, may operate according to an operator policy determined through mutual agreement with the cellular operator 106. For example, the service provider 104 may be a video server of a video broadcasting station or website, such as YouTube™, or other similar stations or websites.

As illustrated, the user 100 may receive service content from the service provider 104 on the data network through the RAN 102, and the service content may be provided within a QoS quota permitted by the cellular operator 106. The QoS quota is determined based on a QoS price policy, and the user 100 may purchase the service content by paying a data/QoS fee to the cellular operator 106.

For a better understanding of the present exemplary embodiment, a high-speed data service provided according to the QoS price policy of the cellular operator 106 will be referred to herein as a QoS acceleration service. In other words, the QoS acceleration service refers to providing a user with a service having a higher QoS than a default QoS designated for the user, wherein the higher QoS is used within a limited time, a limited area, a limited amount of data, and/or a limited amount of money.

FIGS. 2 to 8 illustrate a user interface for a QoS acceleration service according to an exemplary embodiment of the present invention.

Figure 2:
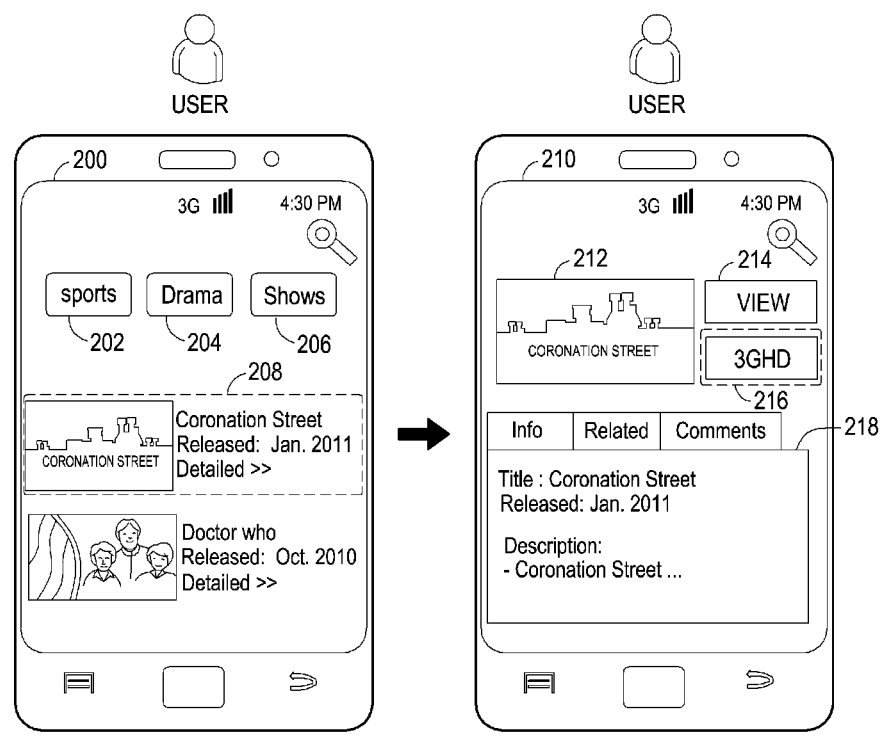
FIGS. 2 to 8 illustrate a user interface for a QoS acceleration service according to an exemplary embodiment of the present invention.

Referring to FIG. 2, a screen 200 of an MS provides video services watchable by a user according to genres at the request of the user. Sports 202, Drama 204 and Shows 206 are genres of the video services according to the present exemplary embodiment. However, the present invention is not limited thereto, and genres of the video services may be any suitable genre of a video service. When the user selects the genre of Drama 204, brief content information 208, such as a preview screen, a title and a broadcast date for each of watchable drama contents, is displayed corresponding to the user's choice. If the user selects his or her desired drama content, e.g., drama content titled "Coronation Street", a screen 210 displays detailed information 218 of the selected drama content, e.g., a trailer 212 and a synopsis 218, or other similar information. The screen 210 provides a first button 214 (shown as a "VIEW" button in FIG. 2) for viewing the selected drama content with the default QoS available according to the QoS quota provided by the service provider or based on the user's service plan, and a second button 216 for viewing the selected drama content using an acceleration QoS determined by the cellular operator. Depending on the RAT and service name, the second button 216 may be labeled as 3G High Definition (3GHD) when 3GPP is used as a RAT.

When the user clicks the second button 216 on the screen 210, the drama content is provided to the user according to the acceleration QoS provided by the cellular operator. In other words, when the user clicks the second button 216 on the screen 210, the drama content is provided to the user at a high data rate corresponding to the acceleration QoS provided by the cellular operator.

Figure 3:
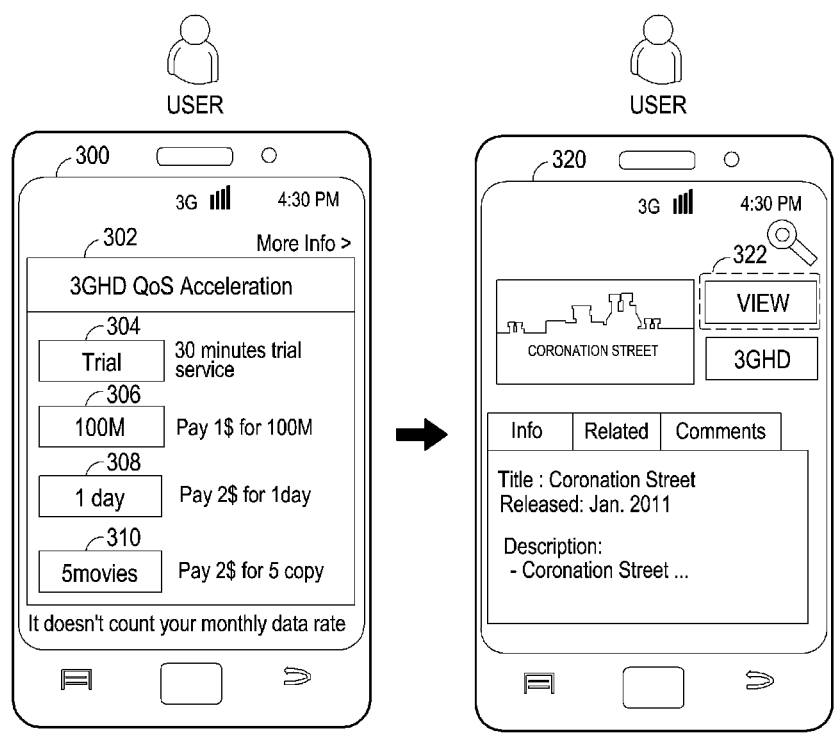

Referring to FIG. 3, a screen 300 displays an information message 302 for the QoS acceleration service that may be displayed when an application supporting the acceleration QoS is running or when the user clicks the second button 216, as shown in FIG. 2. A bill for the QoS acceleration service may be separately issued without being included in the user's monthly plan, or may be issued in any other suitable manner. Depending on whether the QoS plan is supported by the cellular operator, the QoS plan for the QoS acceleration service may be provided as a trial QoS plan 304 for a trial amount of time or data, a volume-based QoS plan 306 for an amount of data, a duration-based QoS plan 308 for an amount of time, and a copy-based QoS plan 310 for an amount of content. The user may select one of the above various types of the QoS acceleration service or any other suitable types of the QoS acceleration service provided by the cellular operator. A screen 320 shows a scenario where the user clicks a first button 322 for viewing the content with the default QoS, and thus, viewing the content without the acceleration QoS.

Figure 4:
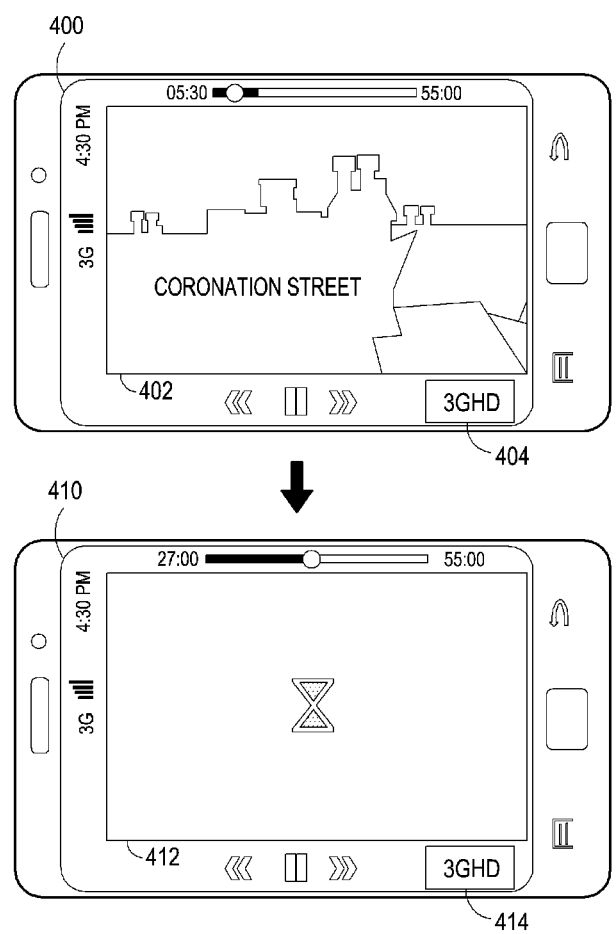

Referring to FIG. 4, a screen 400 shows one scene of drama content 402, which is being played using the default QoS. When the drama content 402 is being played using the default QoS, the screen 400 may display a 3GHD button 404 by which the user may activate the QoS acceleration service. The default QoS may be significantly affected by an amount of traffic transmitted on a network, a number of users on the network, network congestion, or other similar factors or network conditions, because it is provided as a default QoS supported by the service provider. The default QoS may undergo a buffering delay or a drop depending on the circumstances and network conditions. A screen 410 shows a scenario where the drama content 412 being provided with the default QoS is interrupted by a situation or event of the service provider. In this case, the user may choose to use the QoS acceleration service so as to receive the drama content more quickly by immediately clicking a 3GHD button 414 for the QoS acceleration service being provided on the screen 410.

Figure 5:
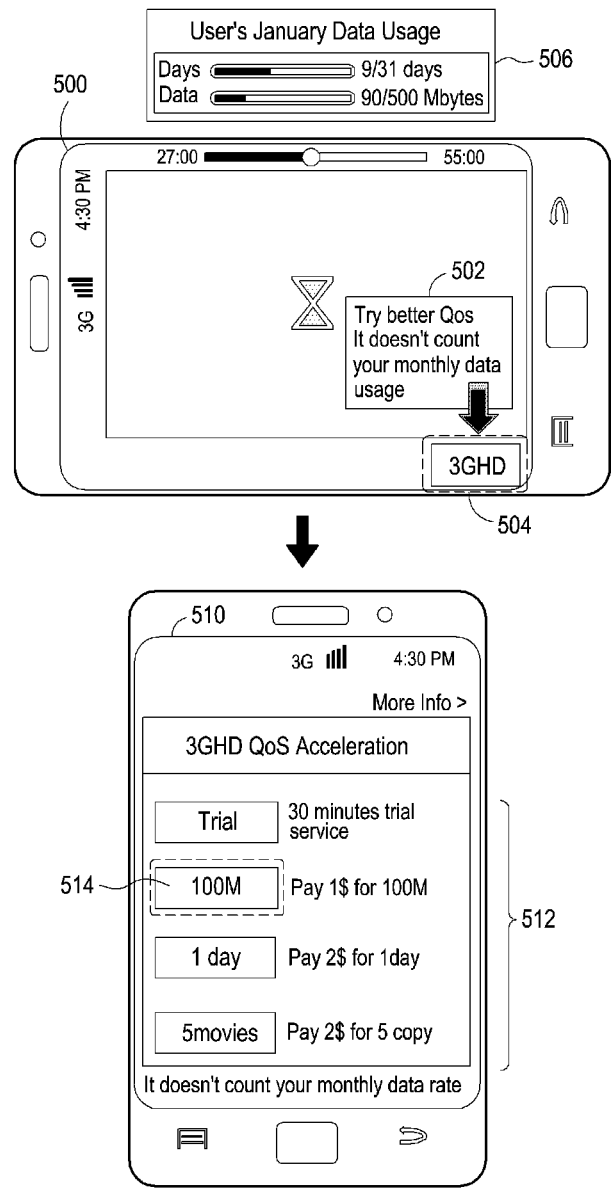

Referring to FIG. 5, when the drama content being provided using the default QoS is interrupted, a screen 500 provides an information message 502 indicating that a fee for the QoS acceleration service is not included in the user's plan, and a 3GHD button 504 for the QoS acceleration service. In an alternative embodiment, for a user's convenience, a data usage window 506, showing an amount of data used by the user may be displayed on the screen 500.

A screen 510 displays an information message 512 for the QoS acceleration service when the user clicks the 3GHD button 504. As illustrated, the QoS acceleration service may be provided in any one of the trial, the volume-based, the duration-based, and the copy-based types, and it will be assumed herein that the user has selected the volume-based 100M QoS acceleration service 514 providing 100 megabytes of data for a predetermined price.

Figure 6:
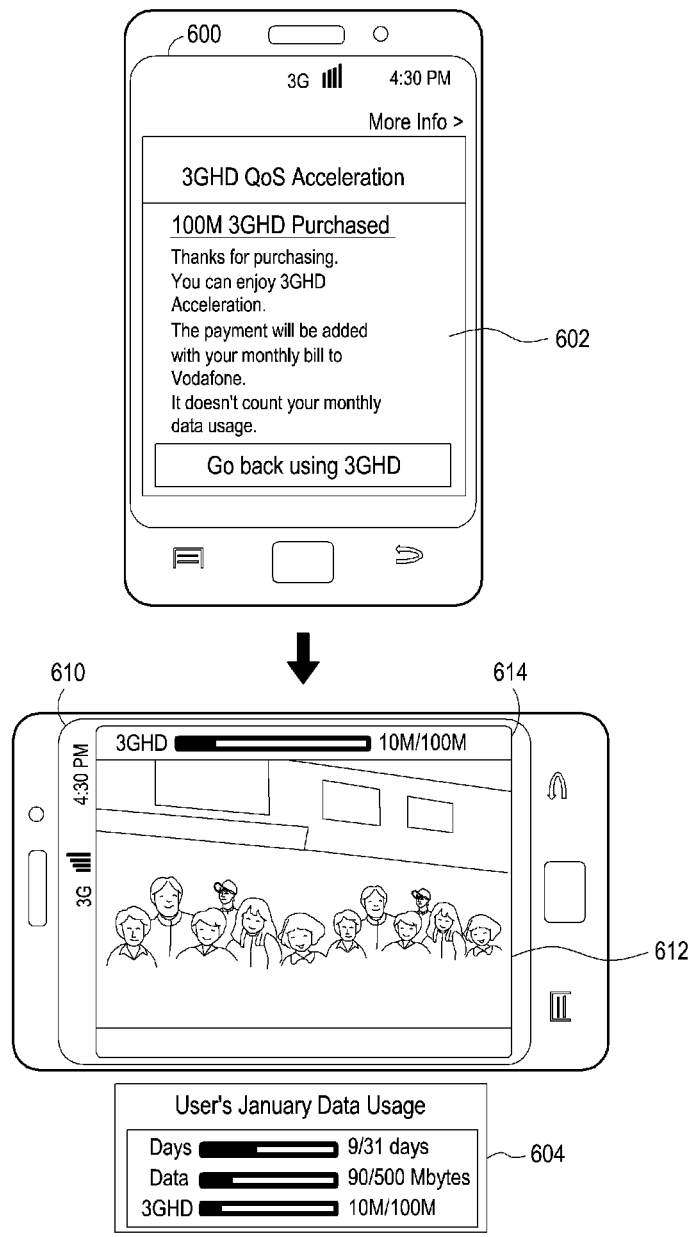

Referring to FIG. 6, a screen 600 provides an information message 602 for the fee of the 100M QoS acceleration service the user has selected. Accordingly, the volume-based 3GHD data volume corresponding to the QoS acceleration service is added to a user's data usage 604 so as to supplement the time and volume included in the user's plan. A screen 610 shows a scene of the drama content 612, which is being played at high speed according to the QoS acceleration service. During the playback of the drama content 612, a status bar 614 for showing the remaining usage may be displayed according to the type of the QoS plan (as discussed with respect to FIG. 5) of the QoS acceleration service.

Figure 7:
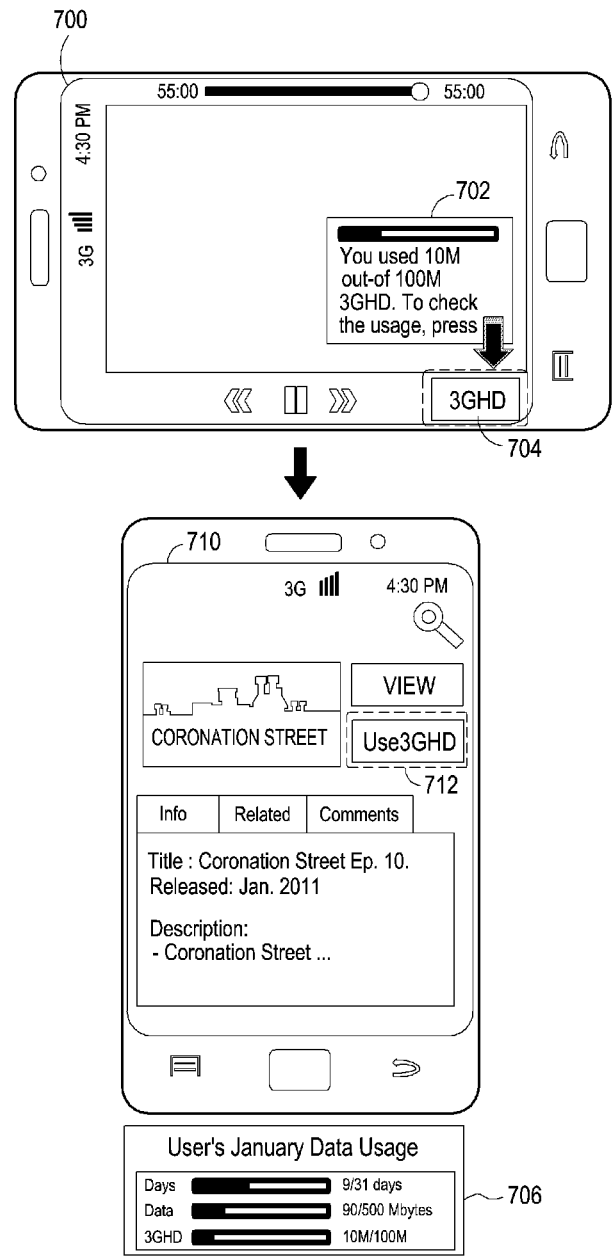

Referring to FIG. 7, if the playback of the drama content 612 selected by the user is terminated, a screen 700 displays an information message 702 showing the remaining volume of the QoS acceleration service and a 3GHD button 704 by which the user may check the detailed usage. If the user clicks the 3GHD button 704, a data usage 706 showing the used data volume or the remaining data volume, with respect to the total volume of the QoS acceleration service, may be provided to the user. If the remaining data volume (or amount of time and number of copies) corresponding to the QoS acceleration service exists, a screen 710 may provide a button 712 (shown as "Use3GHD" in FIG. 7) for allowing the user to use the remaining data volume for the service content according to the acceleration QoS.

Figure 8:
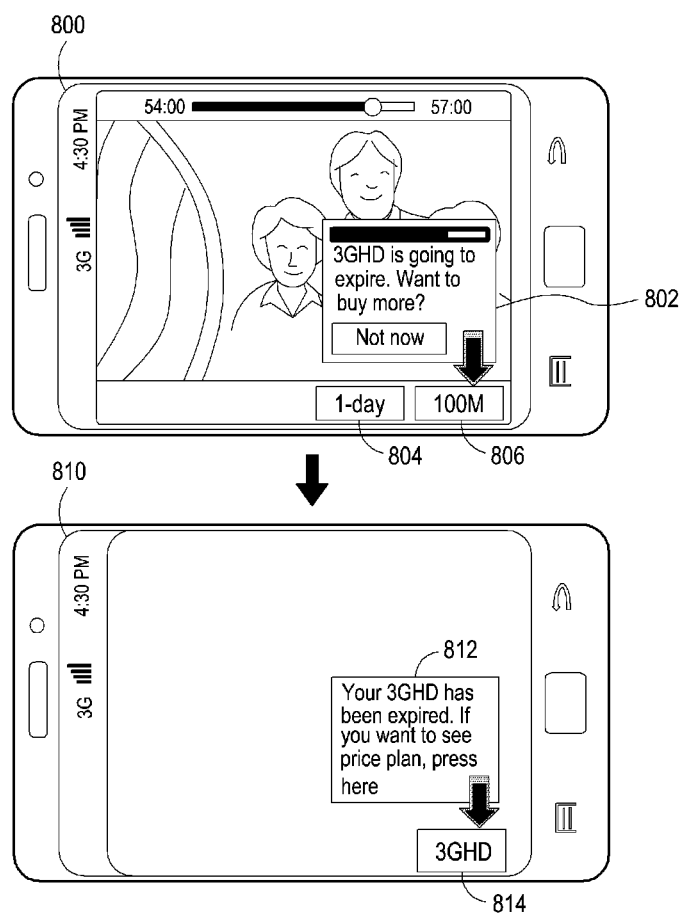

Referring to FIG. 8, while the user is receiving the service content according to the QoS acceleration service, a screen 800 may provide an information message 802 indicating an impending arrival or fulfilling of a QoS quota of the QoS acceleration service. In other words, if the user's data usage impends at the QoS quota before all of the service content has been received, the screen 800 notifies the user of the impending QoS quota using the information message 802 in advance, and provides duration-based and volume-based buttons 804 and 806 by which the user may continue to receive the QoS acceleration service.

A screen 810 shows an expiration of the QoS acceleration service due to the user's not extending the QoS acceleration service. If the playback of the service content is terminated, an information message 812 indicating expiration of the QoS acceleration service and a 3GHD button 814 by which the user may extend the QoS acceleration service may be provided together. If the 3GHD button 814 is clicked, the information message 512 for the QoS acceleration service, as shown in FIG. 5, may be provided to the user.

Figure 9:
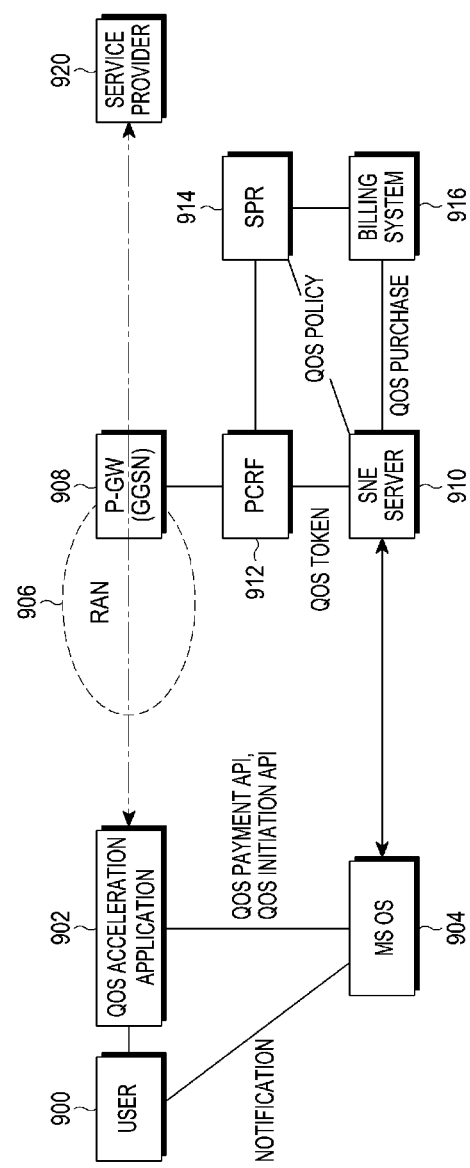
FIG. 9 illustrates an example of a network structure for providing a QoS acceleration service according to an exemplary embodiment of the present invention.

FIG. 9 illustrates an example of a network structure for providing a QoS acceleration service according to an exemplary embodiment of the present invention. Although the names and structures of GPRS-based 3GPP and LTE systems are considered herein, it should be noted that the present invention is not limited thereto, and any suitable network type and structure may be used.

Referring to FIG. 9, a user 900 is a mobile subscriber using a MS or a UE, such as a cellular phone, a PDA, a smart phone, or other similar portable electronic devices, and the MS includes a QoS acceleration application 902 and an MS Operating System (OS) 904. The MS OS 904 installs and runs the QoS acceleration application 902 using various Application Programming Interfaces (APIs), such as a QoS payment API and a QoS initiation API, and acoustically or visually notifies the user 900 of the running or operation of the QoS acceleration application 902 and of an alert provided by the mobile network.

The mobile network, which the user 900 accesses using his or her MS, includes a RAN 906, a P-GW 908, a Policy Charging and Rules Function (PCRF) 912, a Subscriber Profile Repository (SPR) 914, a Smart Network Enabling (SNE) server 910, and a billing system 916.

The RAN 906 supports a communication protocol used by the mobile network and is directly connected to the MS through a wireless interface, such as a Radio Frequency (RF) interface. The P-GW 908 connects the RAN 906 to a service provider 920 providing the PDN, and may be implemented in a 3GPP Gateway GPRS Support Node (GGSN). The PCRF 912 includes a Policy Decision Function (PDF) and a Charging Rules Function (CRF) and provides service-based QoS policy setting and flow-based charging rule for the cellular operator, and the SPR 914 stores and manages subscriber profiles which are based on the cellular operator's policies. The SNE server 910 manages and provides QoS-based high-speed data services, and the billing system 916 bills the user 900 in conjunction with the SNE server 910.

The proposed procedures for providing a QoS acceleration service will now be described in order.

According to the exemplary embodiment of Procedure #1, the user 900 first downloads and installs the QoS acceleration application 902 corresponding to the service provider 920, and determines the QoS price policy of the cellular operator providing the QoS acceleration application 902 during installation or running of the QoS acceleration application 902.

According to the exemplary embodiment of Procedure #2, the QoS acceleration application 902 acquires an authorized token that the mobile network provides when the user 900 pays the price of the QoS acceleration service, which is called a QoS purchase.

According to the exemplary embodiment of Procedure #3, the MS OS 904 configures an acceleration QoS-based bearer to the mobile network for carrying service content of the QoS acceleration service. The bearer may be set up by a UE-initiated bearer setup procedure or an application-triggered, network-initiated bearer setup procedure determined according to the protocol supported by the mobile network.

According to the exemplary embodiment of Procedure #4, the SNE server 910 determines whether expiration of the QoS acceleration service is impending according to the type of the QoS plan (i.e., any one of the trial, volume-based, duration-based, and copy-based types) of the QoS acceleration service selected by the user 900. If the expiration is impending, the SNE server 910 notifies the MS OS 904 of the impending expiration of the QoS acceleration service.

According to the exemplary embodiment of Procedure #5, if the data volume, the amount of time or the number of copies of the QoS acceleration service expires, the SNE server 910 notifies the MS OS 904 of the termination of the authorized token for the QoS acceleration service.

The network structures and message flows for an operation of providing the QoS acceleration service according to the above procedures and exemplary embodiments will be described in detail below with reference to the accompanying drawings, in which the arrows and blocks shown by dotted lines represent optional operations.

Figure 10:
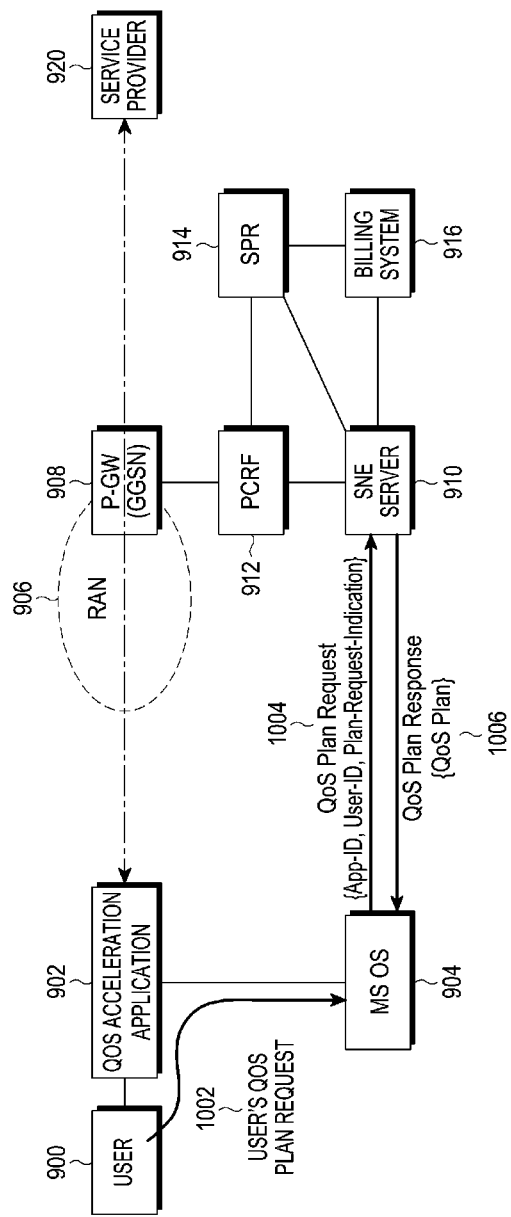
FIG. 10 illustrates an example of a network structure for performing a procedure (Procedure #1) for discovering a QoS acceleration service according to an exemplary embodiment of the present invention.

FIG. 10 illustrates an example of a network structure for performing a procedure for discovering a QoS acceleration service according to an exemplary embodiment of the present invention.

Referring to FIG. 10, and Procedure #1 as discussed above, if the user 900 wants to know the available QoS plans and corresponding QoS price policy provided by the cellular operator for the QoS acceleration service, then the user 900 requests the QoS plan from the MS OS 904 using the QoS acceleration application 902 in step 1002. The QoS plan includes the prices of the QoS acceleration service provided by the cellular operator, and the prices are different according to the types of the QoS acceleration service provided in respective QoS plans. For example, the QoS plan may include fees for 100 Megabits (M) and 1 Gigabit (G) in the volume-based QoS plan, fees for one hour and one day in the duration-based QoS plan, and fees for 5 copies and 10 copies in the copy-based QoS plan. However, the present invention is not limited thereto and a variety of suitable QoS plans may be offered by the cellular operator. For example, according to another exemplary embodiment, the QoS acceleration service may have a QoS plan that is a combination of at least two of the volume-based, duration-based, and copy-based types of QoS plans. Examples of such a QoS plans are shown below.

i) QoS Plan #1: {Plan Type="volume-based", Total-Bytes="100 MB", Price="1$"},
ii) QoS Plan #2: {Plan Type="duration-based", Duration="3 hours", price="1$"},
iii) QoS Plan #3: {Plan Type="volume-duration-based", Total-Bytes="1 GB", Duration="10 days", price="10$"}.

Next, in step 1004, the MS OS 904 sends a QoS Plan Request message to the SNE server 910 using Non-Access Stratum (NAS) signaling. The QoS Plan Request message includes, for example, at least one of Application IDentification information (App-ID) for identifying an application using the QoS acceleration application 902, a user IDentifier (ID) for identifying the MS that the user 900 uses, Plan Request Indication for indicating a request for the QoS plan, and any other suitable or relevant information.

The App-ID may include, for example, an application type (i.e., an OS type), an application name, and an application version. The App-ID may be used by the cellular operator in order to determine whether it will permit the QoS acceleration service and to deliver predefined QoS parameters, as the cellular operator determines whether it will enable or disable use of the QoS acceleration feature of the application. Examples of the App-ID are shown below.

i) {Application-Type=Android, Application-name="com.google.app.application_name", version=1.0}, ii) {Application-Type=APPL, Application-name="com.yourcompany.myapp", version=1.0}.

The user ID is assigned such that the mobile network may uniquely identify the user, and may be any one of an International Mobile Subscriber Identifier (IMSI), a Network Access Identifier (NAI), and a Universal Resource Location (URL). The IMSI may include a combination of a Mobile Network Code (MNC), a Mobile Country Code (MCC) and a Mobile Subscriber Identification Number (MSIN). Examples of the user ID are shown below.

i) IMSI=MNC, MCC, MSIN,
ii) NAI (e-mail address)=user.lee@kt.com,
iii) URL=http://id.my-idp.com/user.lee.

In step 1006, in response to the QoS Plan Request message, the SNE server 910 sends a QoS Plan Response message including the stored information about the QoS plan to the MS OS 904. As described above, the QoS plan information includes respective prices of different QoS acceleration service types.

Figure 11:
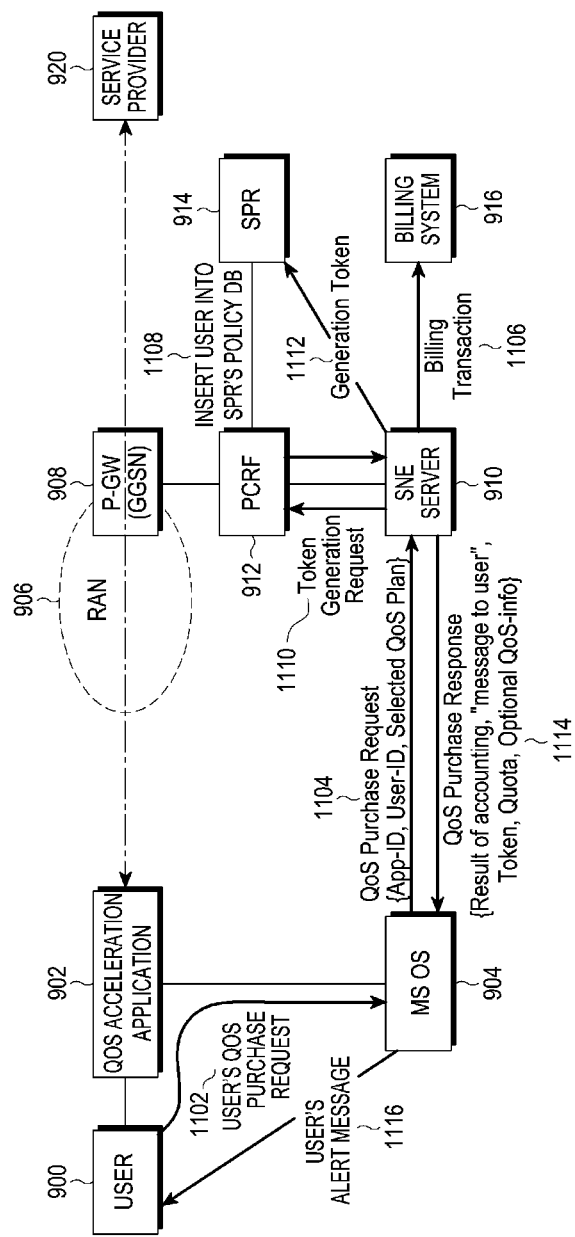
FIG. 11 illustrates an example of a network structure for performing a procedure (Procedure #2) for purchasing a QoS acceleration service and acquiring a token according to an exemplary embodiment of the present invention.

FIG. 11 illustrates an example of a network structure for performing a procedure for purchasing a QoS acceleration service and acquiring a token according to an exemplary embodiment of the present invention.

Referring to FIG. 11 and Procedure #2 as discussed above, in step 1102, the user 900 selects a type of QoS plan and fee depending on the price policies of QoS plans displayed on a screen of the MS, and requests purchase of the QoS acceleration service from the MS OS 904 according to the selected QoS plan. In step 1104, the MS OS 904 sends a QoS Purchase Request message to the SNE server 910. The QoS Purchase Request message includes at least one of an App-ID, a user ID and information about the selected QoS plan.

In step 1106, the SNE server 910, in conjunction with the billing system 916, determines whether the fee for the selected QoS plan has been paid. If the fee has been paid, then in step 1108, the PCRF 912 inserts a subscriber profile of the user 910 into a policy DataBase (DB) of the SPR 914, thereby recording the purchase of the QoS plan by the user 910.

In step 1110, the SNE server 910 sends a Token Generation Request message to the PCRF 912 to acquire a token needed to authorize provision of the service corresponding to the QoS plan. In step 1112, the SNE server 910 receives from the PCRF 912 the token generated in response to the request and the SNE server 910 provides the token to the SPR 914. The token includes, for example, a unique identifier indicating the authorization of the provision of the service corresponding to the QoS plan, a time stamp indicating a start time and an end time for which the authorized bearer may be maintained, authorized data, and other similar information related to the authorization of the provision of the service. The token may be used by the PCRF 912 to authorize a setup request in the UE-initiated bearer setup procedure.

In step 1114, in response to the QoS Purchase Request message, the SNE server 910 sends the MS OS 904 a QoS Purchase Response message including at least one of a 'result of accounting [success]' message, a 'message to user', the generated token, a QoS quota based on the QoS plan, and optional QoS information.

The QoS quota may include at least one of or a combination of at least two of a volume-based quota, a duration-based quota, and a copy-based quota depending on the type of the QoS acceleration service. Examples of the QoS quota are shown below.

i) Volume-based quota {Quota Type="volume-based", Total-Bytes="100 MB"},
ii) Duration-based quota {Quota Type="duration-based", Duration="3 hours"},
iii) Transaction-based quota {Quota Type="transaction-based", Frequency="3"}.

The QoS information includes at least one of QoS parameters (e.g., a QoS Class Identifier (QCI), a Maximum Bit Rate (MBR)/Guaranteed Bit Rate (GBR), an Allocation and Retention Priority (ARP), and an IP packet filtering condition) required by the SNE server 910 for individual QoS acceleration applications.

The QCI, which is a parameter for QoS configuration previously made by the cellular operator, may be, for example, a scheduling weight, a permitted threshold, a queue management threshold, or other similar variables used for QoS configuration. The GBR is a bit rate that can be provided by the bearer, and is limited by the MBR.

In step 1116, in response to the QoS Purchase Response message, the MS OS 904 notifies the user 900 of the success or failure in purchasing the QoS acceleration service by displaying a message on a screen of the user's MS. For example, upon receiving an information message for the user 900 from the SNE server 910, the MS OS 904 may display the received information message on the screen.

The QoS purchase request may be rejected by the SNE server 910, if the QoS acceleration application 902 is not authorized to use the QoS acceleration service according to the application policy of the cellular operator, or if the user 900 is not authorized to use the QoS acceleration service according to the subscriber policy of the user 900, or if the SNE server 910 is not able to determine whether the fee has been paid or determines that the fee has not been paid in conjunction with the billing system 916. Although not illustrated, in this case, the SNE server 910 sends a notification message indicating the rejection of the QoS acceleration service to the user 900 through the MS OS 904 in the QoS Purchase Response message. Furthermore, according to another exemplary embodiment, even when the QoS acceleration service is rejected, the QoS acceleration application 902 may provide the data service using the default QoS-based default bearer.

Figure 12:
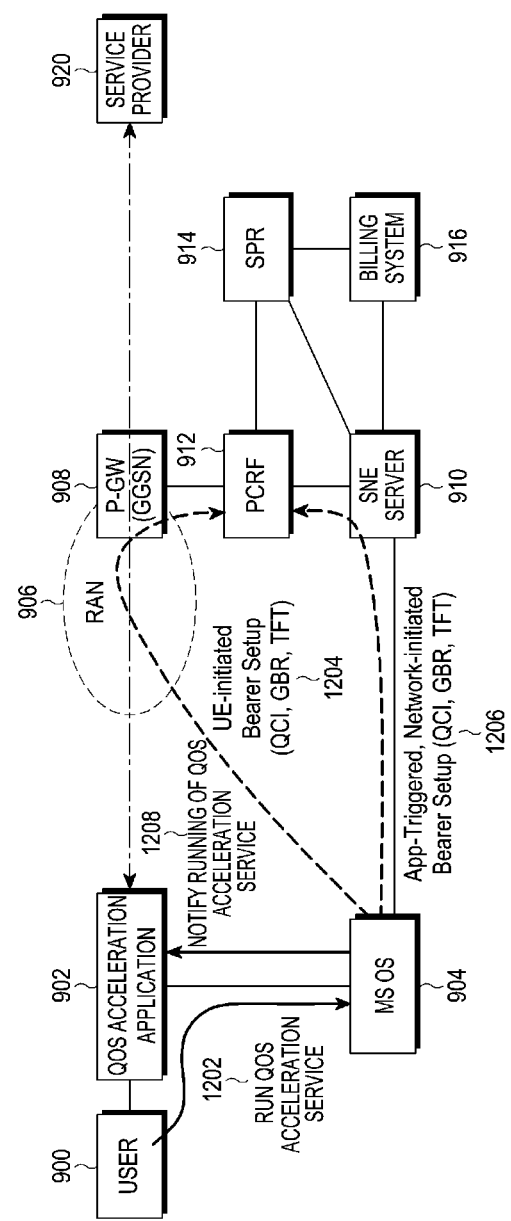
FIG. 12 illustrates an example of a network structure for performing a procedure (Procedure #3) for running a QoS acceleration service according to an exemplary embodiment of the present invention.

FIG. 12 illustrates an example of a network structure for performing a procedure for running a QoS acceleration service according to an exemplary embodiment of the present invention.

Referring to FIG. 12 and Procedure #3 as discussed above, in step 1202, the user 900 triggers a QoS acceleration service by clicking a 3GHD button for triggering use of QoS using the QoS acceleration application 902. Next, one of steps 1204 or 1206 is performed, wherein, in step 1204, the MS OS 904 sets up a bearer capable of supporting the QoS acceleration service by performing the UE-initiated bearer setup procedure with the P-GW 908 or, in step 1206, by performing the network-initiated bearer setup procedure with the SNE server 910 when the QoS acceleration service is triggered. The service content from the service provider 920 is delivered to the MS OS 904 through the bearer that has been set up, and the QoS acceleration application 902 plays the service content so that the user 900 may view it.

In setting up the bearer, reference may be made to QoS parameters, such as a QCI, a GBR, a Traffic Flow Template (TFT), and other similar QoS parameters. During the bearer setup procedure, the QoS acceleration application 902 may acquire QoS information, such as screen size and codec information, from the service provider 920 via Session Initiation Protocol (SIP) signaling or Real-Time Streaming Protocol (RTSP) signaling, and the MS OS 904 converts the QoS information into QoS parameters, such as the TFT, the QCI, the GBR/MBR, and the ARP, suitable for the 3G network. According to another exemplary embodiment, if the cellular operator already knows the performance of the QoS acceleration application 902, the cellular operator may store these QoS parameters in a DB of the SNE server 910 in advance. According to another exemplary embodiment, during a download of the QoS acceleration application 902, a QoS profile representing appropriate QoS parameters may be included in a downloaded file. Next, in step 1208, the service provider 920 notifies the QoS Acceleration Application 902 of the running of the QoS acceleration service.

Figure 13:
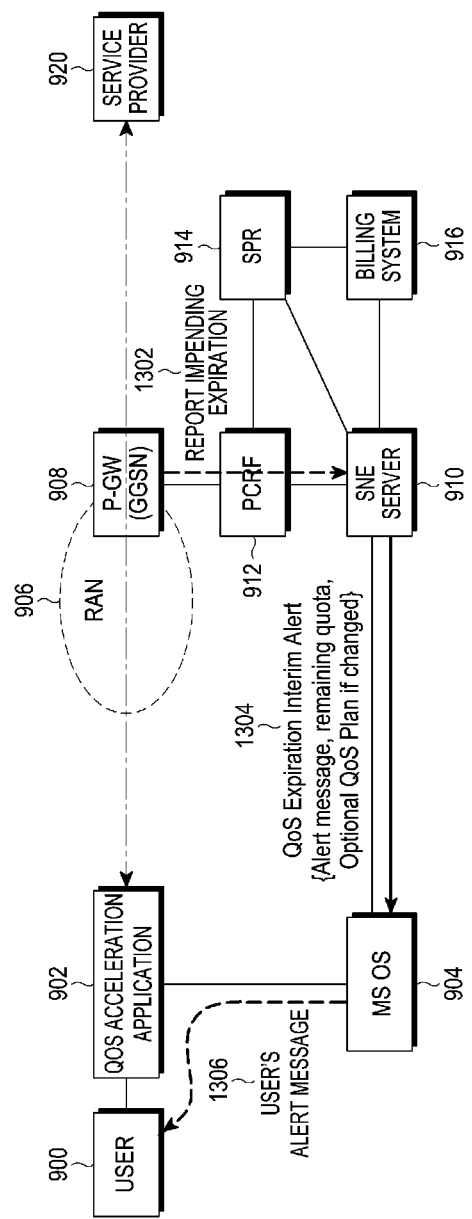
FIG. 13 illustrates an example of a network structure for performing a procedure (Procedure #4) for notifying an impending expiration of a QoS acceleration service according to an exemplary embodiment of the present invention.

FIG. 13 illustrates an example of a network structure for performing a procedure for notifying an impending expiration of a QoS acceleration service according to an exemplary embodiment of the present invention.

Referring to FIG. 13 and Procedure #4 as disclosed above, it is assumed that the QoS acceleration service is provided based on the data volume. The P-GW 908 continuously monitors a usage of the data delivered on the bearer that is set up for the QoS acceleration service, and determines whether the monitored data usage approaches a QoS quota for each user for the bearer. To this end, the SNE server 910 notifies the P-GW 908 of the QoS quota based on the QoS plan allocated for the QoS acceleration application 902 in advance (i.e., prior to the start of the QoS acceleration service), or records the QoS quota in a subscriber profile of the SPR 914 in advance. If the amount of the data usage reaches a threshold predetermined to be less than the QoS quota, the P-GW 908 reports an impending expiration of the QoS acceleration service to the SNE server 910 in step 1302.

In step 1304, the SNE server 910 inserts at least one of an Alert message, the remaining QoS quota, and an optional QoS plan into a QoS Expiration Interim Alert message, and sends it to the MS OS 904. For example, the QoS plan may be included in the QoS Expiration Interim Alert message if the QoS plan is changed. In step 1306, the MS OS 904 sends a User Alert message to the user 900 through the QoS acceleration application 902 in response to the QoS Expiration Interim Alert message. The user 900 may review the User Alert message and perform additional operations, such a purchase of additional amounts of the QoS acceleration service and termination of the QoS acceleration service.

According to another exemplary embodiment, if the QoS acceleration service is provided according to the duration of time or the number of copies, the MS OS 904 records the User Alert message in the QoS acceleration application 902 even though the QoS acceleration application 902 is disabled. In such a case, the MS OS 904 records the User Alert message upon recognizing that the duration of time has elapsed or that the number of copies received using the QoS acceleration service has reached the predetermined QoS quota. Then, when enabled later by the user's action, the QoS acceleration application 902 may show the User Alert message to the user 900, thereby introducing an appropriate following user's action.

Figure 14:
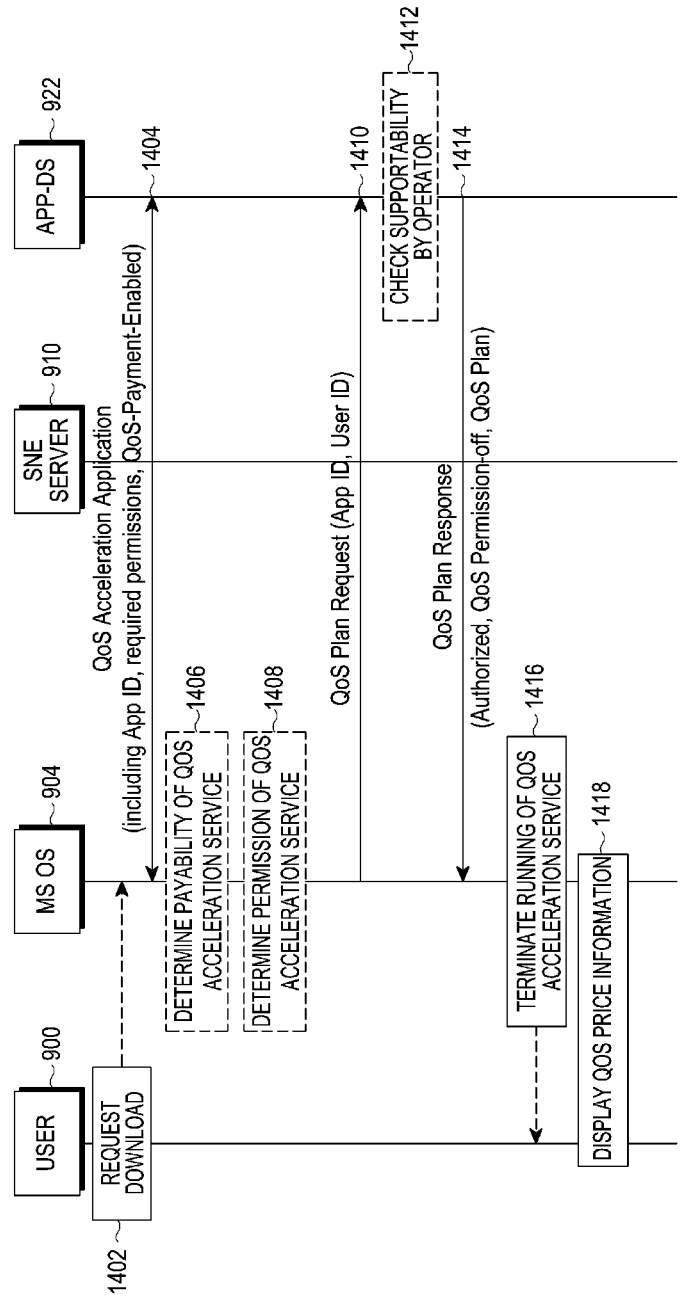
FIG. 14 illustrates a message flow for performing the procedure of FIG. 10 for discovering a QoS acceleration service according to an exemplary embodiment of the present invention.

FIG. 14 illustrates a message flow for performing the procedure of FIG. 10 for discovering a QoS acceleration service according to an exemplary embodiment of the present invention.

Referring to FIG. 14, the user 900 requests download of the QoS acceleration application 902 supporting the QoS acceleration service from the MS OS 904 in step 1402, and the MS OS 904 requests the QoS acceleration application 902 from a QoS acceleration Application Download Server (APP-DS) 922 and downloads the QoS acceleration application 902 in step 1404. Depending on its implementation, the downloaded QoS acceleration application 902 includes at least one of App-ID, permissions used for the QoS acceleration service, and QoS Payment Enabled information indicating the possibility of paying a fee for the QoS acceleration service.

The MS OS 904 determines whether a fee for the QoS acceleration service is payable according to the downloaded QoS acceleration application 902 in step 1406, and determines in step 1408 whether the feature (i.e., use of a QoS API) used for the downloaded QoS acceleration application 902 is permitted by the cellular operator. Steps 1406 and 1408 are optional according to an implementation of the present exemplary embodiment.

In step 1410, the MS OS 904 sends a QoS Plan Request message including at least one of App-ID, user ID, and plan request indication to the SNE server 910 or, alternatively, to the APP-DS 922 which may be included in the SNE server 910. In step 1412, the SNE server 910 determines whether the cellular operator may support the QoS acceleration service for the QoS acceleration application 902 corresponding to the App-ID in response to the QoS Plan Request message, and may determine whether to provide the QoS plan only when the cellular operator supports the QoS acceleration service. However, the present invention is not limited thereto, and according to another exemplary embodiment, the SNE server 910 may permit the QoS acceleration service by default without step 1412.

In step 1414, the SNE server 910 sends a QoS Plan Response message including the QoS plan to the MS OS 904. The QoS Plan Response message may further include Authorized information indicating the authorization of the QoS acceleration application 902 and QoS Permission-off information indicating the permission of the QoS acceleration service.

In step 1416, the MS OS 904 may terminate the QoS acceleration application 902 until running of the QoS acceleration service is requested. In step 1418, the MS OS 904 or the QoS acceleration application 902 shows the QoS price policy corresponding to the QoS plan to the user 900 upon completion of the download, during running of the QoS acceleration application 902, or at the user's request, thereby supporting the user's selection of the QoS acceleration service.

Figure 15:
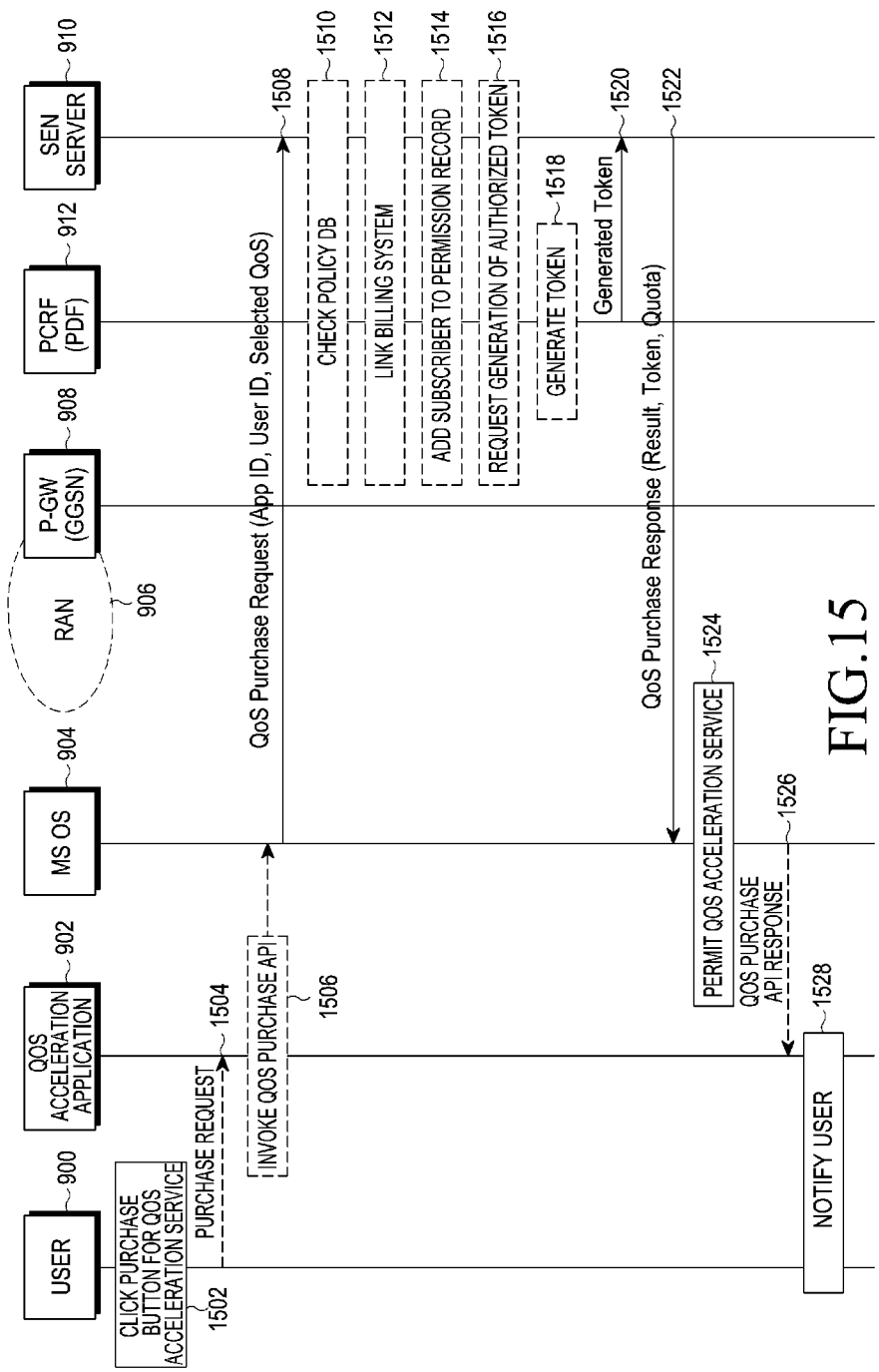
FIG. 15 illustrates a message flow for performing the procedure of FIG. 11 for purchasing a QoS acceleration service and acquiring a token according to an exemplary embodiment of the present invention.

FIG. 15 illustrates a message flow for performing the procedure of FIG. 11 for purchasing a QoS acceleration service and acquiring a token according to an exemplary embodiment of the present invention.

Referring to FIG. 15, in step 1502, the user 900 reviews the QoS price policy shown on the screen of the running QoS acceleration application 902 and selects a purchase button corresponding to the QoS acceleration service corresponding to user's desired QoS plan. Upon receiving a purchase request for the QoS acceleration service in step 1504, the QoS acceleration application 902 invokes a QoS purchase API and sends a purchase request based on the selected QoS plan to the MS OS 904 in step 1506.

In step 1508, the MS OS 904 sends a QoS Purchase Request message, including an App-ID, a user ID, and a selected QoS plan, to the SNE server 910. Depending on an implementation of the SNE server 910, the SNE server 910 authorizes the purchase of the QoS acceleration service by the user 900 by performing at least one of steps 1510 through 1520 in response to the QoS Purchase Request message.

Specifically, in step 1510, the SNE server 910 searches the policy DB of the SPR 914 (see FIG. 13) and determines that the QoS acceleration application 902 corresponding to the App-ID has been permitted by the cellular operator and is executable. In step 1512, the SNE server 910, in conjunction with the billing system 916, determines whether a fee for the selected QoS plan has been paid. In step 1514, the SNE server 910 adds a subscriber profile of the user 900 to the policy DB of the SPR 914 so that the user 900 may use the QoS acceleration service based on the selected QoS plan.

In step 1516, the SNE server 910 requests the PCRF 912 to generate a token used to authorize provision of the QoS acceleration service based on the QoS plan. In step 1518, the PCRF 912 generates an authorized token in response to the request and authorizes the user 900. In step 1520, the PCRF 912 sends information indicating the authorization of the user 900 to the SNE server 910 along with the generated token.

In step 1522, in response to the QoS Purchase Request message, the SNE server 910 sends the MS OS 904 a QoS Purchase Response message including the purchase result (i.e., a successful payment message), the generated token, and the QoS quota based on the QoS plan. The QoS Purchase Response message may further include information on a predetermined lifetime of the token and QoS permission information.

In step 1524, the MS OS 904 authorizes the QoS acceleration service for the QoS acceleration application 902 and stores the QoS quota and the token having the predetermined lifetime. In step 1526, the MS OS 904 sends a response to the QoS acceleration service 902 using the QoS purchase API. In step 1528, the QoS acceleration application 902 notifies the user 900 of the successful completion of the purchase of the QoS acceleration service.

Figure 16:
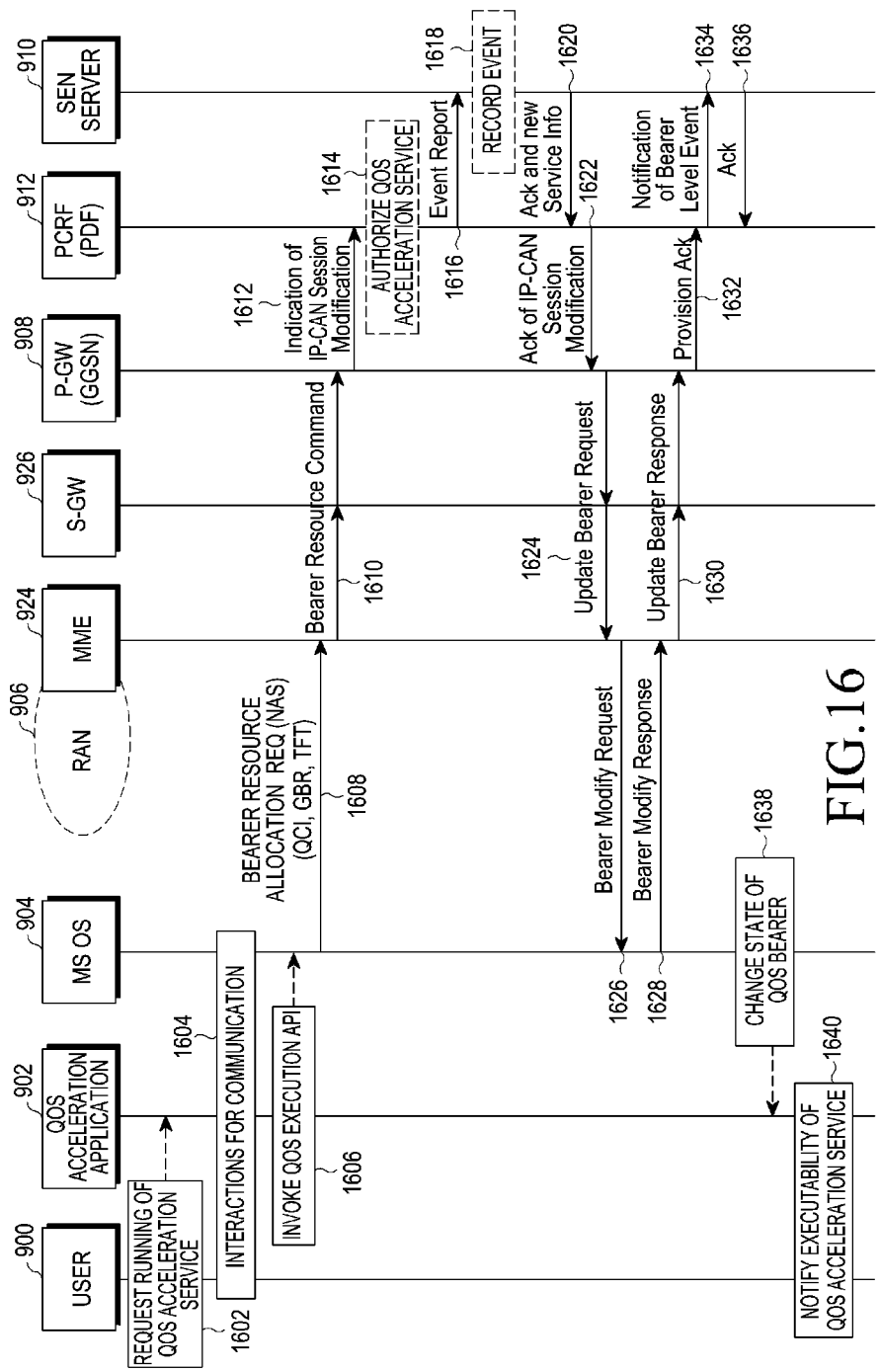
FIG. 16 illustrates a message flow for performing the procedure of FIG. 12 for running a QoS acceleration service according to an exemplary embodiment of the present invention.

FIG. 16 illustrates a message flow for performing the procedure of FIG. 12 for running a QoS acceleration service according to an exemplary embodiment of the present invention.

Referring to FIG. 16, it is assumed that a bearer is set up by the UE-initiated bearer setup procedure during running of the QoS acceleration service. If the user 900 requests running of the QoS acceleration service, i.e., playback of service content based on the QoS acceleration service, in step 1602, the QoS acceleration application 902 performs interactions for communications with the service provider 920 (see FIG. 13) which is a peer node, and acquires QoS-related information from the service provider 920 through negotiation in step 1604. For example, in the case of Voice over Internet Protocol (VoIP), the QoS-related information includes codec information, an address/port number of the peer node, bandwidth, and other similar information. As another example, in the case of Video on Demand (VoD), the QoS-related information includes the address/port number of the peer node, bandwidth, resolution, and other similar VoD information.

In step 1606, the QoS acceleration application 902 invokes a QoS execution API to set up a bearer based on the acceleration QoS. During invocation of the QoS execution API, QoS information such as a TFT, a GBR/MBR, and an ARP is provided to the MS OS 904.

In step 1608, the MS OS 904 sends a Bearer Resource Allocation Request message to a Mobility Management Entity (MME) 924 connected to the RAN 906 (which may be an Evolved-Universal Terrestrial RAN (E-UTRAN) in a 3GPP LTE network) through NAS signaling. The Bearer Resource Allocation Request message may include a QCI, a GBR and a TFT for the acceleration QoS.

In step 1610, the MME 924 requests setup of an acceleration QoS-based bearer by sending a Bearer Resource Command message to the P-GW 908 through a Serving Gateway (S-GW) 926. In step 1612, the P-GW 908 sends indication of an IP Connectivity Access Network (IP-CAN) session modification to the PCRF 912. The PCRF 912 authorizes the request for the QoS acceleration service in response to the indication in step 1614, and sends an event report indicating the authorization of the QoS acceleration service to the SNE server 910 in step 1616. The SNE server 910 records an event corresponding to an event report in step 1618, and responds to the PCRF 912 with an Acknowledgement (Ack) including new service information in step 1620.

In step 1622, the PCRF 912 sends an Ack of the IP-CAN session modification to the P-GW 908. In step 1624, the P-GW 908 requests update of the bearer by sending an Update Bearer Request message to the MME 924 through the S-GW 926. In step 1626, the MME 924 sends a Bearer Modify Request message for an update of the bearer to the MS OS 904. In step 1628, the MS OS 904 responds to the MME 924 with a Bearer Modify Response message.

In step 1630, the MME 924 informs the P-GW 908 of the update of the bearer by sending an Update Bearer Response message to the P-GW 908 through the S-GW 926. In step 1632, the P-GW 908 sends a Provision Ack message to the PCRF 912. In step 1634, the PCRF 912 sends a Notification of Bearer Level Event message indicating the update of the bearer to the SNE server 910. In step 1636, the SNE server 910 responds with an Ack.

In step 1638, the MS OS 904 changes a state of the bearer for the QoS acceleration service to an Enabled state after completing the modification of the bearer by sending the Bearer Modify Response message in step 1628, invokes a related API, sets up a bearer, and informs the QoS acceleration application 902 of availability thereof. In step 1640, the QoS acceleration application 902 shows to the user 900 an information message indicating the executability of the QoS acceleration service.

Figure 17:
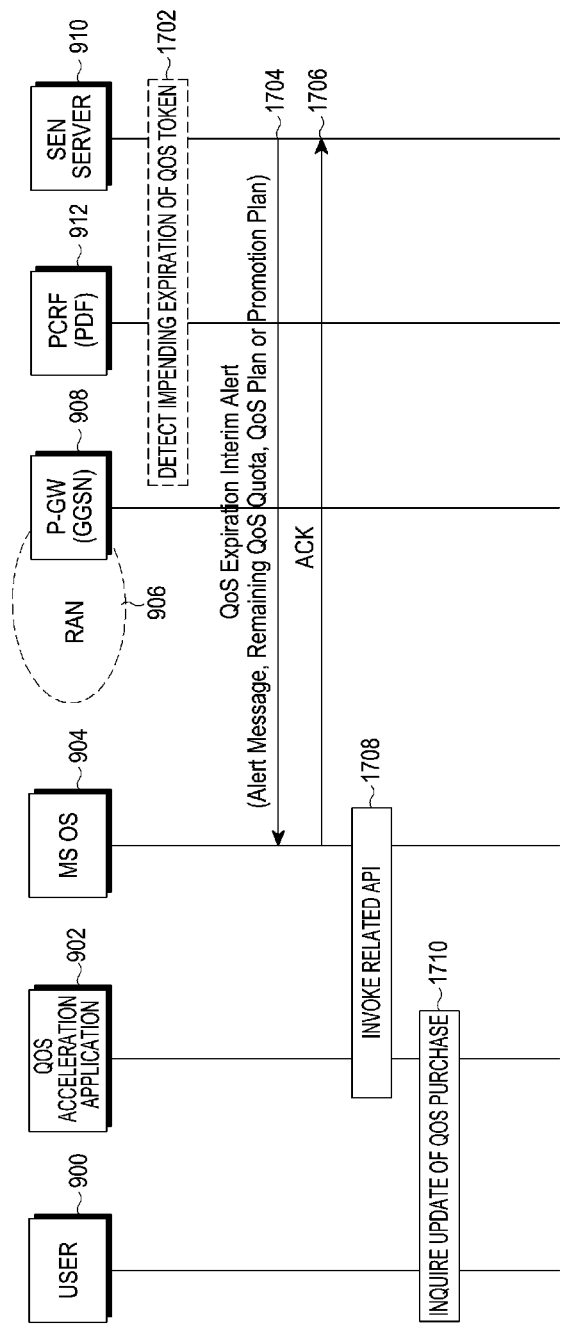
FIG. 17 illustrates a message flow for performing the procedure of FIG. 13 for notifying an impending expiration of a QoS acceleration service according to an exemplary embodiment of the present invention.

FIG. 17 illustrates a message flow for performing the procedure FIG. 13 for notifying an impending expiration of a QoS acceleration service according to an exemplary embodiment of the present invention.

Referring to FIG. 17, the SNE server 910 detects an impending expiration of a QoS token, i.e., a QoS quota will soon be at a predetermined threshold, in step 1702. For example, when the QoS acceleration service is provided based on the data volume, the SNE server 910 detects an impending QoS quota based on an event report from the PCRF 912. Alternatively, when the QoS acceleration service is provided based on the time duration, the SNE server 910 monitors whether the QoS quota is impending by counting the time for which the QoS acceleration service has been run.

In step 1704, the SNE server 910 inserts at least one of an alert message, the remaining QoS quota, and an optional QoS plan or promotion plan into a QoS Expiration Interim Alert message, and sends it to the MS OS 904. The MS OS 904 responds to the message with an Ack in step 1706, and then invokes a related API and informs the QoS acceleration application 902 of the impending QoS quota in step 1708. In step 1710, the QoS acceleration application 902 inquires of the user 900 whether the user will purchase additional QoS acceleration service by notifying the user 900 of an information message indicating the impending expiration of the QoS token and of the optional remaining QoS quota. If the user 900 purchases the additional QoS acceleration service, then Procedure #2, as shown in FIG. 15, will be performed again.

Figure 18:
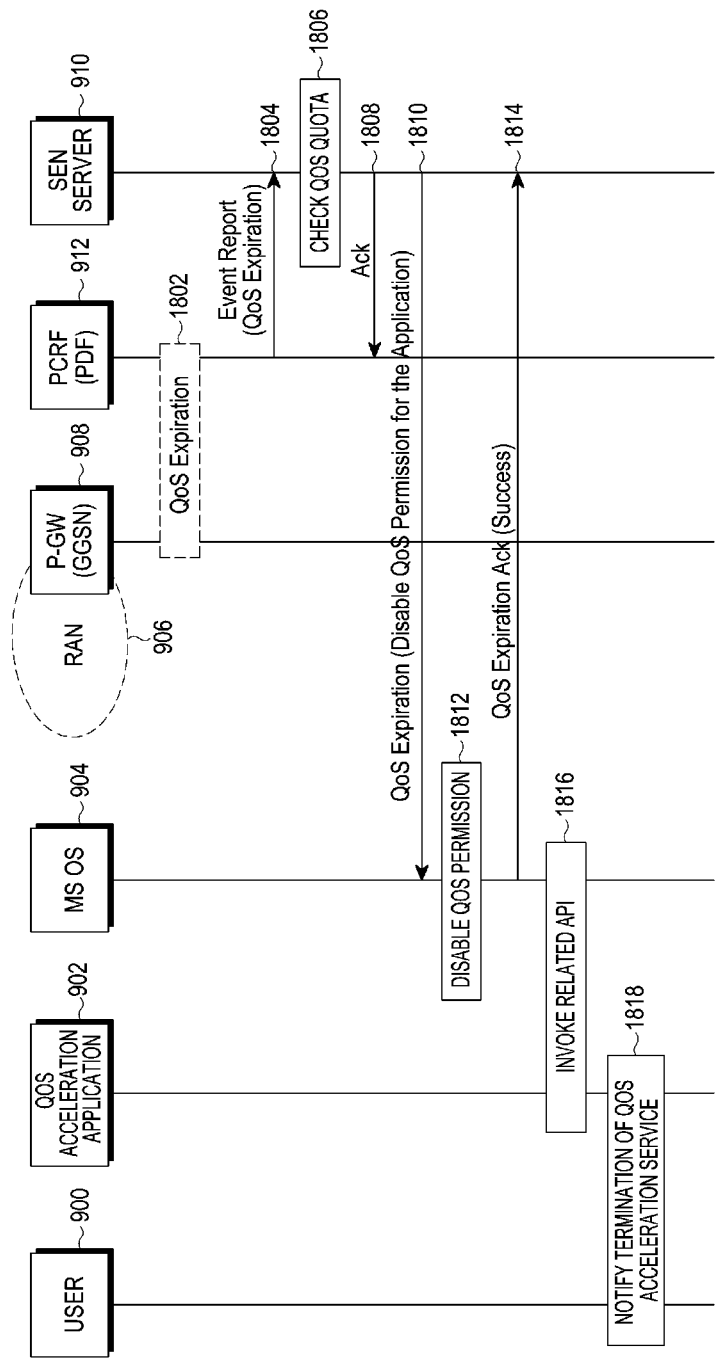
FIG. 18 illustrates a message flow for performing a procedure for terminating a QoS acceleration service according to an exemplary embodiment of the present invention.

FIG. 18 illustrates a message flow for performing a procedure for terminating a QoS acceleration service according to an exemplary embodiment of the present invention.

Referring to FIG. 18, it is assumed that a volume-based QoS acceleration service is provided. In step 1802, the P-GW 908 measures data usage by monitoring packets carried on a bearer that is set up for the QoS acceleration service, and sends a QoS Expiration message to the PCRF 912 if the measured data usage has approaches the QoS quota determined for the QoS acceleration service. Optionally, the QoS quota may further include the data usage of the QoS acceleration service.

In step 1804, the PCRF 912 sends the SNE server 910 an event report indicating the expiration of the QoS quota. The SNE server 910 reviews the expiration of the QoS quota by determining the QoS quota assigned to the subscriber and the application using the QoS acceleration service in step 1806, and responds to the PCRF 912 with an Ack in step 1808. According to another exemplary embodiment, the SNE server 910 may determine that the QoS quota has expired without receiving any event report from the PCRF 912, if the lifetime of the QoS token for the QoS acceleration service has expired, if the time duration allocated for the QoS acceleration service has elapsed, or if the number of copies allocated for the QoS acceleration service have been all used.

In step 1810, the SNE server 910 sends a QoS Expiration message to the MS OS 904. The QoS Expiration message may include information indicating the disablement of the QoS permission for the QoS acceleration application 902. In step 1812, the MS OS 904 disables the QoS permission so that the QoS acceleration application 902 may not be used. In step 1814, the MS OS 904 sends the SNE server 910 a QoS Expiration Ack message indicating the successful disablement of the QoS acceleration service.

In step 1816, the MS OS 904 invokes a related API, and informs the QoS acceleration application 902 of the expiration of the QoS acceleration service. In step 1818, the QoS acceleration application 902 outputs an information message indicating the termination of the QoS acceleration service and may optionally inquire of the user 900 whether he or she will purchase further amounts the QoS acceleration service.

In FIGS. 13 and 17, if the QoS acceleration service is provided based on the volume, the PCRF 912 may manage the subscriber information and the price and traffic information in conjunction with a Policy and Charging Enforcement Function (PCEF) in order to determine whether the data usage arrives at the QoS quota based on the QoS plan of the QoS acceleration service.

Figure 19:
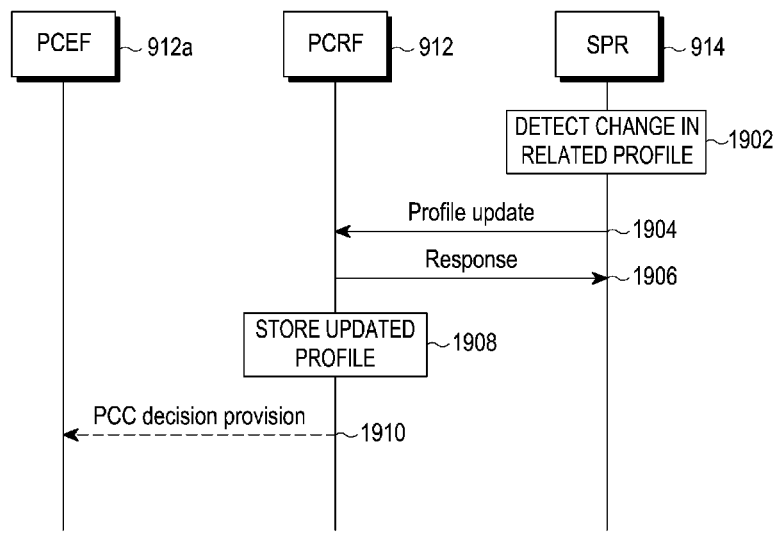
FIG. 19 illustrates a message flow for performing a procedure for managing subscriber information in a Policy Change and Rules Function (PCRF) according to an exemplary embodiment of the present invention.

FIG. 19 illustrates a message flow for performing a procedure for managing subscriber information in a PCRF according to an exemplary embodiment of the present invention.

Referring to FIG. 19, the SPR 914 detects a change in a related subscriber profile according to the QoS price policy (i.e., QoS plan) for the QoS acceleration service provided by the cellular operator in step 1902. Next, the SPR 914 informs the PCRF 912 of the change in the subscriber profile by sending a Profile Update message to the PCRF 912 in step 1904, and receives a Response message indicating the normal reception of the Profile Update message from the PCRF 912 in step 1906. The subscriber profile may include or indicate the QoS quota of each type of the QoS plan based on the QoS plan.

In step 1908, the PCRF 912 stores the subscriber profile, and determines a Policy and Charging Control (PCC) rule based on the subscriber profile. In step 1910, the PCRF 912 sends the determined PCC rule to a PCEF 912a using a PCRF-initiated IP-CAN session modification procedure. The PCC rule includes a QoS plan-based volume threshold that is set by the PCRF 912.

If a bearer for the QoS acceleration service is set up and packets are transmitted over the bearer, then the PCEF 912a determines whether the data usage measured by the P-GW 908 reaches the threshold, and sends a usage report to the PCRF 912, along with an alert including a threshold interim report, if the measured data usage has reached the threshold. The PCRF 912 may send a threshold interim alert to the SNE server 910 according to the usage report from the PCEF 912a as described above.

The SPR 914 stores user's usage monitoring-related information, and the PCRF 912 receives information about the entire amount data usage permitted for each PDN and/or user from the SPR 914. Optionally, upon receiving the usage report from the PCEF 912a, the PCRF 912 may provide the PCEF 912a with a new volume threshold determined by subtracting the actual usage, which is based on the usage report, from the permitted data usage. If the bearer for the QoS acceleration service is terminated, the PCRF 912 stores information about the remaining usage in the SPR 914.

The above-described embodiments may be implemented in the form of program commands executable by various computer means and may be recorded in a non-transient computer-readable recording medium. The non-transient computer-readable recording medium may include program commands, data files, and data structures separately or in combination. The program commands recorded in the non-transient computer-readable recording medium may be program commands designed and configured specially for the present invention, or available program commands known to those skilled in the art of computer software.

Furthermore, the above-described embodiments may be implemented by mounting a memory device storing program codes for performing the operations in the SNE server, the PCRF, the MS, and other similar elements. In other words, the SNE server, the PCRF and the MS may perform the above-described operations by reading the program codes stored in the memory device and may execute the read program codes by a processor or a Central Processing Unit (CPU). Specifically, all or at least one of the SNE server, the PCRF and the MS are configured to perform operations of at least one of the above-described embodiments.

Figure 20:
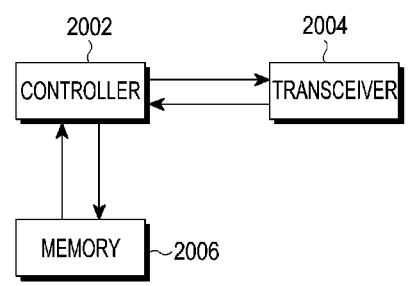
FIG. 20 illustrates a brief structure of an Smart Network Enabling (SNE) server, a PCRF or a Mobile Station (MS) according to an exemplary embodiment of the present invention.

FIG. 20 illustrates a brief structure of an SNE server, a PCRF or an MS according to an exemplary embodiment of the present invention.

Referring to FIG. 20, when the exemplary embodiment of FIG. 20 operates as an SNE server, a memory 2006 stores a QoS plan based on the QoS price policy of the cellular operator, parameters for supporting the QoS acceleration service, and program codes. Additionally, in such a case, a transceiver 2004 communicates with an MS OS through a NAS, and communicates with network elements such as a PCRF, an SPR and a billing system through a predetermined interface. A controller 2002 provides an MS with the QoS plan stored in the memory 2006 in response to a request from the MS OS, provides the MS with a QoS token acquired through the PCRF by controlling the transceiver 2004 upon a QoS purchase request, supports a connection of a bearer for the QoS acceleration service, and notifies the MS OS of the impending QoS expiration or the QoS expiration.

When the exemplary embodiment of FIG. 20 operates as a PCRF, the memory 2006 stores parameters for supporting the QoS acceleration service and program codes, and the transceiver 2004 communicates with network elements related to the QoS acceleration service, such as the P-GW, the SPR, and the SNE server. The controller 2002 generates a token for the QoS acceleration service upon a request from the SNE server, provides the generated token to the SNE server, supports a connection of the bearer for the QoS acceleration service, monitors a data usage through the P-GW, and reports an impending QoS expiration to the SNE server if the amount of data usage has reached a threshold for the QoS quota.

When the structure operates as an MS, the memory 2006 stores a QoS acceleration application and parameters generated by an operation of the QoS acceleration application, and the transceiver 2004 receives service content through a RAN and communicates with the SNE server through the NAS. The controller 2002 runs the QoS acceleration application, acquires a QoS plan from the SNE server upon a request of the user, stores the acquired QoS plan in the memory 2006, purchases a token for the QoS acceleration service, and plays the service content received over an acceleration QoS-based bearer so that the user may view it. The controller 2002 may inform the user of the impending QoS expiration or the termination of the QoS acceleration service by running the QoS acceleration application.

As is apparent from the foregoing description, for specific service content desired by the user, the present invention provides fast data service using the cellular operator rather than the service provider, thereby satisfying diverse data consumption needs of users.

While the invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. A method for providing a Quality of Service (QoS)-based service in a network server of a wireless communication system, the method comprising:
    providing, by the network server, a Mobile Station (MS) with at least one QoS plan indicating a price policy for a QoS acceleration service in response to a request from the MS for the QoS acceleration service having a higher QoS than a default QoS designated for a user of the MS;
    providing, by the network server, the MS with an authorized token and a QoS quota based on a QoS plan selected for the QoS acceleration service in response to a purchase request of the MS;
    providing, by the network server, the MS with service contents selected by the user through a radio bearer for the QoS acceleration service;
    if a usage of the QoS acceleration service reaches a threshold according to the QoS quota, notifying, by the network server, the MS of an impending expiration of the QoS acceleration service; and
    if the QoS acceleration service has expired, notifying, by the network server, the MS of the expiration of the QoS acceleration service,
    wherein the authorized token comprises at least one of an identifier indicating an authorization of the QoS acceleration service, a time stamp indicating a start time and an end time for which the radio bearer for the QoS acceleration service may be maintained, and authorized data, and
    wherein the providing of the MS with the authorized token and the QoS quota comprises:
        receiving, from the MS, a purchase request message comprising at least one of application identification information of a QoS acceleration application installed in the MS for the QoS acceleration service, a user identifier for the MS, and a QoS plan selected by the user of the MS; and
        sending the MS a purchase response message comprising at least one of the payment result, a QoS quota based on the authorized token and the QoS plan, and QoS information for providing the QoS acceleration service according to the QoS plan.

2. The method of claim 1, wherein the at least one QoS plan includes at least one of a data volume-based QoS plan, a time duration-based QoS plan and a number of copies-based QoS plan, or a combination thereof,
    wherein the data volume-based QoS plan corresponds to a data volume of the data and a fee for the data that can be used by the QoS acceleration service,
    wherein the time duration-based QoS plan corresponds to a time duration and a fee for which the QoS acceleration service can be used, and
    wherein the number of copies-based QoS plan correspond to a number of copies of and a fee for available service content.

3. The method of claim 1, wherein the providing of the MS with the authorized token and the QoS quota comprises:
    determining, by accessing a billing system, whether a fee based on the selected QoS plan has been paid in response to the purchase request message;
    recording subscriber information related to the MS, if the fee has been paid, in a policy DataBase (DB) of a Subscriber Profile Repository (SPR);
    requesting generation of an authorized token based on the selected QoS plan from a Policy Charging and Rules Function (PCRF); and
    acquiring an authorized token generated according to the QoS plan from the PCRF.

4. The method of claim 1, wherein the notifying of the MS of the impending expiration of the QoS acceleration service comprises:
    receiving, from a Policy Charging and Rules Function (PCRF), an event report indicating that an amount of data usage of the radio bearer for the QoS acceleration service has reached a threshold for the QoS quota; and
    sending the MS an expiration interim alert message indicating an impending expiration of the QoS acceleration service.

5. The method of claim 1, wherein the notifying of the MS of the expiration of the QoS acceleration service comprises:
    receiving, from a Policy Charging and Rules Function (PCRF), an event report indicating that an amount of data usage of the radio bearer for the QoS acceleration service has reached the QoS quota; and
    sending the MS an expiration alert message indicating an expiration of the QoS acceleration service.

6. An apparatus for providing a Quality of Service (QoS)-based service in a network server of a wireless communication system, the apparatus comprising:
    a memory configured to store at least one QoS plan indicating a price policy for a QoS acceleration service in response to a request from a Mobile Station (MS) for the QoS acceleration service having a higher QoS than a default QoS designated for a user of the MS; and
    a controller configured to provide the QoS plan to the MS, determining an authorized token and a QoS quota based on a QoS plan selected by the user for the QoS acceleration service in response to a purchase request of the user, and providing the MS with service contents selected by the user through a radio bearer for the QoS acceleration service,
    wherein if a usage of the QoS acceleration service reaches a threshold according to the QoS quota, the controller notifies the MS of an impending expiration of the QoS acceleration service, and if the QoS acceleration service has expired, the controller notifies the MS of the expiration of the QoS acceleration service, and
    wherein the authorized token comprises at least one of an identifier indicating an authorization of the QoS acceleration service, a time stamp indicating a start time and an end time for which the radio bearer for the QoS acceleration service may be maintained, and authorized data, and wherein the controller is configured to receive, from the MS, a purchase request message comprising at least one of application identification information of a QoS acceleration application installed in the MS for the QoS acceleration service, a user identifier for the MS, and a QoS plan selected by the user of the MS, and to send the MS a purchase response message comprising at least one of the payment result, a QoS quota based on the authorized token and the QoS plan, and QoS information for providing the QoS acceleration service according to the QoS plan.

7. The apparatus of claim 6, wherein the at least one QoS plan includes at least one of a data volume-based QoS plan, a time duration-based QoS plan and a number of copies-based QoS plan, or a combination thereof, wherein the data volume-based QoS plan corresponds to a data volume of the data and a fee for the data that can be used by the QoS acceleration service, wherein the time duration-based QoS plan corresponds to a time duration and a fee for which the QoS acceleration service can be used, and wherein the number of copies-based QoS plan corresponds to a number of copies of and a fee for available service content.

8. The apparatus of claim 6, wherein the controller is configured to determine whether a fee based on the selected QoS plan has been paid in conjunction with a billing system in response to the purchase request message, wherein the controller is configured to record subscriber information related to the MS, if the fee has been paid, in a policy DataBase (DB) of a Subscriber Profile Repository (SPR), wherein the controller is configured to request generation of an authorized token based on the selected QoS plan from a Policy Charging and Rules Function (PCRF), and wherein the controller is configured to acquire an authorized token generated according to the QoS plan from the PCRF.

9. The apparatus of claim 6, wherein upon receiving, from a Policy Charging and Rules Function (PCRF), an event report indicating that an amount of data usage of the radio bearer for the QoS acceleration service has reached a threshold for the QoS quota, the controller is configured to send the MS an expiration interim alert message indicating an impending expiration of the QoS acceleration service.

10. The apparatus of claim 6, wherein upon receiving, from a Policy Charging and Rules Function (PCRF), an event report indicating that an amount of data usage of the radio bearer for the QoS acceleration service has reached the QoS quota, the controller is configured to send the MS an expiration alert message indicating an expiration of the QoS acceleration service.

11. A method for selecting a Quality of Service (QoS)-based service in a Mobile Station (MS) of a wireless communication system, the method comprising:

displaying, on a screen of the MS, at least one QoS plan indicating a price policy for a QoS acceleration service in response to a request from a user of the MS for the QoS acceleration service having a higher QoS than a default QoS designated for a user of the MS;

transmitting a purchase request corresponding to a selected one of the at least one QoS plan to a Base Station (BS) providing the MS with an authorized token and a QoS quota based on the selected QoS plan;

receiving a purchase response from the BS in response to the transmitting of the purchase request; and receiving, at the MS, service contents selected by the user through a radio bearer for the QoS acceleration service, wherein the authorized token comprises at least one of an identifier indicating an authorization of the QoS acceleration service, a time stamp indicating a start time and an end time for which the radio bearer for the QoS acceleration service may be maintained, and authorized data, wherein the purchase request comprises at least one of application identification information of a QoS acceleration application installed in the MS for the QoS acceleration service, a user identifier for the MS, and a QoS plan selected by the user of the MS; and wherein the purchase response comprises at least one of the payment result, a QoS quota based on the authorized token and the QoS plan, and QoS information for providing the QoS acceleration service according to the QoS plan.

12. The method of claim 11, further comprising:

receiving, by the MS, if a usage of the QoS acceleration service reaches a threshold according to the QoS quota, a message indicating an impending expiration of the QoS acceleration service; and receiving by the MS, if the QoS acceleration service has expired, a message indicating the expiration of the QoS acceleration service.

13. The method of claim 12, further comprising displaying, on the screen of the MS after the expiration of the QoS acceleration service, a button for generating another purchase request for the QoS acceleration service corresponding to the selected service contents.

14. The method of claim 11, wherein the at least one QoS plan includes at least one of a data volume-based QoS plan, a time duration-based QoS plan and a number of copies-based QoS plan, or a combination thereof, wherein the data volume-based QoS plan corresponds to a data volume of the data and a fee for the data that can be used by the QoS acceleration service, wherein the time duration-based QoS plan corresponds to a time duration and a fee for which the QoS acceleration service can be used, and wherein the number of copies-based QoS plan correspond to a number of copies of and a fee for available service content.

15. The method of claim 11, further comprising displaying, on the screen of the MS, a button for initiating the QoS acceleration service corresponding to the selected service contents.

16. An apparatus for selecting a Quality of Service (QoS)-based service in a Mobile Station (MS) of a wireless communication system, the apparatus comprising:

a controller for displaying, on a screen of the MS, at least one QoS plan indicating a price policy for a QoS acceleration service in response to a request from a user of the MS for the QoS acceleration service having a higher QoS than a default QoS designated for the user of the MS;

a transmitter configured to transmit a purchase request corresponding to a selected one of the at least one QoS plan to a Base Station (BS) providing the MS with an authorized token and a QoS quota based on the selected QoS plan; and a receiver configured to receive a purchase response from the BS in response to the transmitting of the purchase request, and to receive service contents selected by the user through a radio bearer for the QoS acceleration service, wherein the authorized token comprises at least one of an identifier indicating an authorization of the QoS acceleration service, a time stamp indicating a start time and an end time for which the radio bearer for the QoS acceleration service may be maintained, and authorized data, wherein the purchase request comprises at least one of application identification information of a QoS acceleration application installed in the MS for the QoS acceleration service, a user identifier for the MS, and a QoS plan selected by the user of the MS; and wherein the purchase response comprises at least one of the payment result, a QoS quota based on the authorized token and the QoS plan, and QoS information for providing the QoS acceleration service according to the QoS plan.

17. The apparatus of claim 16, wherein the receiver is configured to receive a message indicating an impending expiration of the QoS acceleration service if a usage of the QoS acceleration service reaches a threshold according to the QoS quota, and wherein the receiver is configured to receive a message indicating the expiration of the QoS acceleration service if the QoS acceleration service has expired.

18. The apparatus of claim 17, wherein the controller is configured to display, on the screen of the MS and after the expiration of the QoS acceleration service, a button for generating another purchase request for the QoS acceleration service corresponding to the selected service contents.

19. The apparatus of claim 16, wherein the at least one QoS plan includes at least one of a data volume-based QoS plan, a time duration-based QoS plan and a number of copies-based QoS plan, or a combination thereof, wherein the data volume-based QoS plan corresponds to a data volume of the data and a fee for the data that is usable by the QoS acceleration service, wherein the time duration-based QoS plan corresponds to a time duration and a fee for which the QoS acceleration service is useable, and wherein the number of copies-based QoS plan correspond to a number of copies of and a fee for available service content.

20. The apparatus of claim 16, wherein the controller is configured to display, on the screen of the MS, a button for initiating the QoS acceleration service corresponding to the selected service contents.

\* \* \* \* \*